April 28, 1964  J. HEZLER, JR  3,130,498
DUPLICATOR

Filed June 6, 1960  2 Sheets-Sheet 1

INVENTOR.
Julius Hezler, Jr.
BY
C. P. Barnard
ATTORNEY

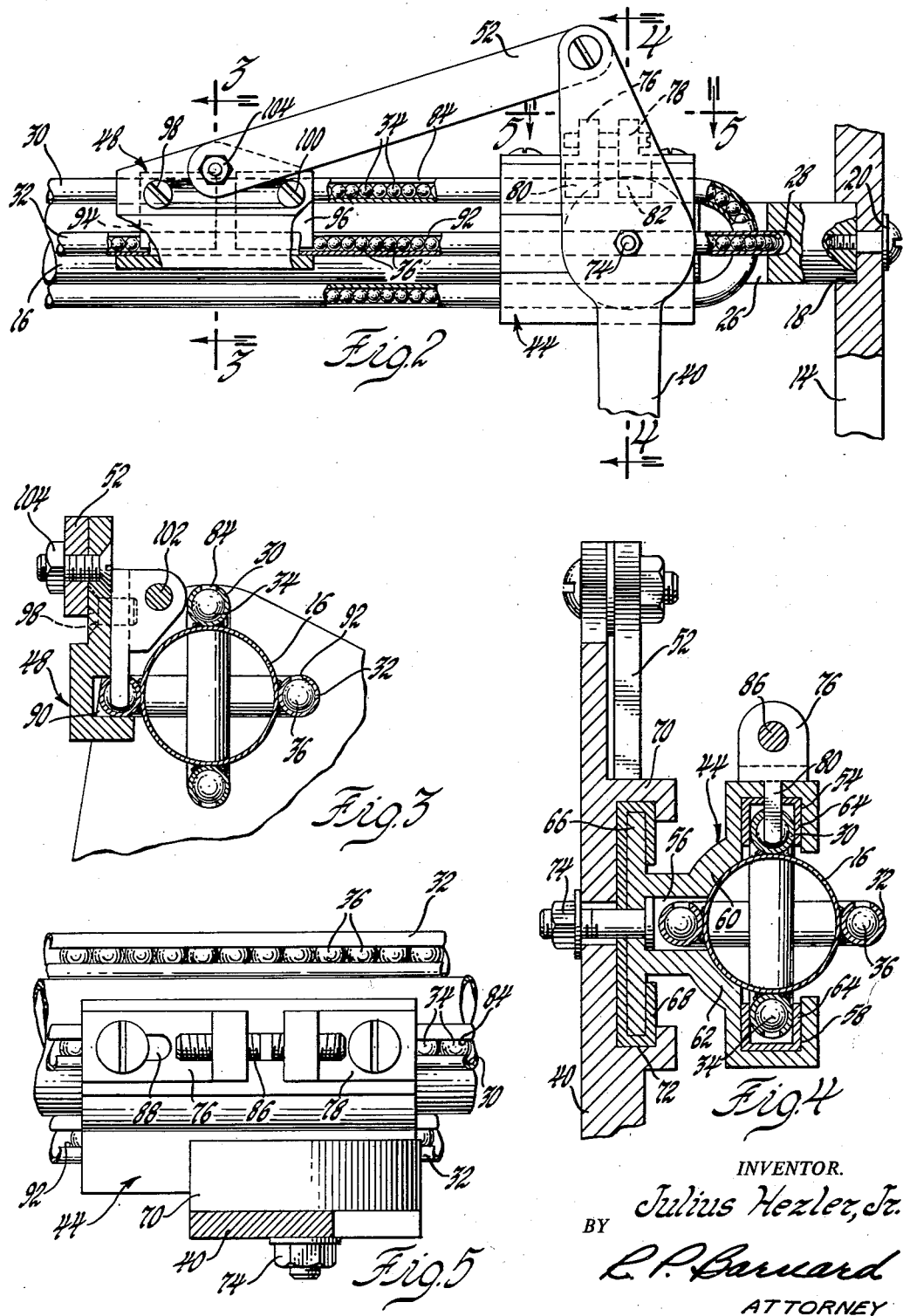

United States Patent Office 3,130,498
Patented Apr. 28, 1964

3,130,498
DUPLICATOR
Julius Hezler, Jr., East Detroit, Mich., assignor to General Motors Corporation, Detroit, Mich., a corporation of Delaware
Filed June 6, 1960, Ser. No. 34,152
11 Claims. (Cl. 33—23)

This invention relates to new and useful improvements in duplicating apparatus and more particularly in mechanism wherein a follower arm is movably positioned in response to movement of a spaced control arm.

The invention is particularly intended for use in reproducing the opposite of a symmetrical surface such as automobile bumpers, grilles, hoods, windshields, roofs and the like. For instance, if a pattern of or a die for forming a right-hand automobile fender has been made, a control arm of a duplicator can be caused to travel over the surface of the die or pattern so that a corresponding reversely positioned left-hand fender is traced or produced by a follower arm. Thus, the patterns or dies would be reversely symmetrical.

It is an object of this invention to provide duplicating mechanism having means for transmitting the movement of a control arm or similar apparatus to a follower or controlled arm so that lost motion and slipping of the driving parts is reduced to a minimum. It is another object of this invention to provide duplicating mechanism wherein motions caused in one of two spaced members are exactly reversely duplicated in the other spaced member. It is a further object of this invention to provide improved means for reversely duplicating a left-hand model to form a right-hand model.

Other objects and advantages of this invention will become apparent from the following detailed specification wherein reference is made to the accompanying drawings in which:

FIGURE 2 is a partial detail side elevational view, partly in section, of the device shown in FIGURE 1;

FIGURE 3 is a sectional view taken along the line 3—3 in FIGURE 2;

FIGURE 4 is a sectional view taken along the line 4—4 in FIGURE 2; and

FIGURE 5 is a sectional view taken along the line 5—5 in FIGURE 2.

Figure 1:
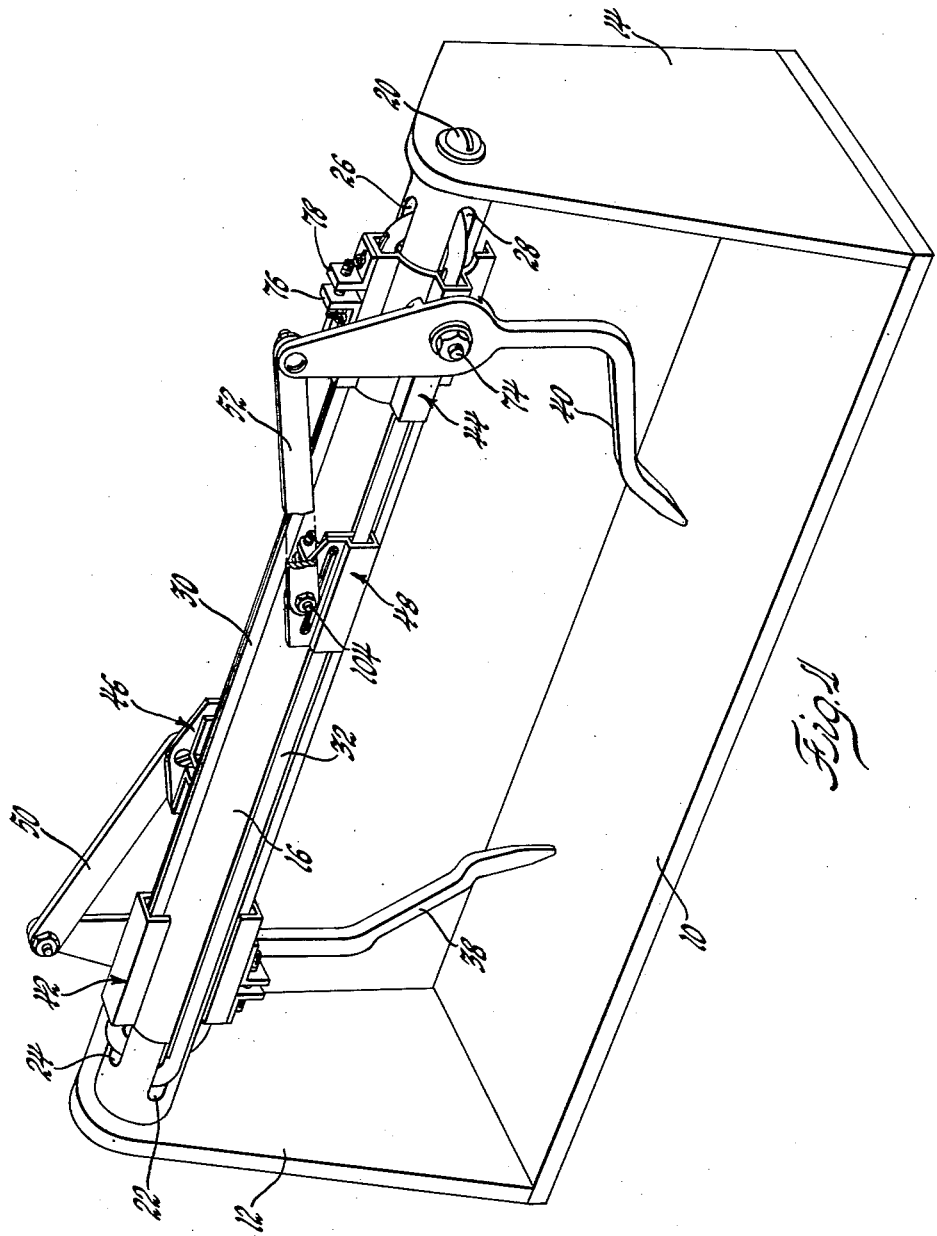
FIGURE 1 is a perspective view of an illustrative embodiment of the present invention.

Referring now to FIGURE 1, the duplicating mechanism is supported on any suitable device, such as a stand comprising a base 10 and upwardly extending spaced pillar members 12, 14. A tubular support member 16 extends between the pillar members and is rotatably supported thereby as shown in FIGURE 2 by the provision of a cylindrical counterbore 18 in each of the pillar members. A screw member 20 or other suitable fastening device is connected to each end of the tubular support member 16 and extends through the adjacent pillar to rotatably support the duplicating mechanism. Referring again to FIGURE 1, each end of the tube member 16 is provided with transverse intersecting slots 22, 24 and 26, 28. Endless tube members 30, 32 are welded or otherwise suitably secured to the outer periphery of the tubular support member 16 and extend through the slots 24, 26 and 22, 28 to provide a continuous path. Each of the tube members comprises parallel longitudinally extending portions having the ends thereof interconnected by curved tube portions. Each of the tube members contains power transferring means, such as a plurality of ball members 34, 36 which are closely positioned in surface engagement with one another in each of the tube members. A pair of structurally identical tracing arms 38, 40 are pivotally supported on identical carriage members 42, 44 and are pivotally actuable by identical slide mechanisms 46, 48 and identical link members 50, 52. Since the apparatus is identical only the follower apparatus is described in detail.

As shown in FIGURES 2, 4 and 5, the carriage member 44 comprises a housing having three spaced longitudinally extending guideways 54, 56, 58 which are interconnected by arcuate sections 60, 62. A bearing plate 64 may be placed in the opposite facing guideways 54, 58. The carriage housing is assembled over the end of the tubular support member 16 so that the endless tube members 30, 32 are received within the guideways 54, 56, 58 and the carriage 44 is slidably supported thereby. In addition, the arcuate portions 60, 62 are slidably engageable with the outer peripheral surface of the tubular support member 16 to provide additional support. A cylindrical bearing plate 66 is formed on the carriage housing opposite the guideway 56 and a bearing cap 68 is secured thereto. A hub 70 is provided on the tracing arm 40 and is provided with a bearing seat 72 by which the tracing arm 40 is rotatably secured to the bearing cap and bearing plate by a threaded fastening device 74. A pair of spacer shoes 76, 78 are mounted on the carriage housing opposite the upper guideway 54 and each include downwardly depending spacer plates 80, 82 which extend through the carriage housing and into the guideway 54. A slot 84 is provided in the top of the upper portion of the endless tube member 30 and the lower extremities of the spacer plates 80, 82 are received therein. A threaded adjusting screw 86 extends between the spacer shoes 76, 78 and a slot 88 provided in the spacer shoe 76 permits limited axial adjustment of the spacing between the spacer plates 80, 82.

As shown in FIGURES 2 and 3, the slide mechanism 48 comprises a plate member having a guideway 90 that slidingly accommodates one of the longitudinal portions of the endless tube member 32 which has an upwardly opening guide slot 92 extending therealong. A pair of spacer plates 94, 96 are secured to the slide mechanism by screw members 98, 100, or other suitable means, and extend downwardly into the endless tube 32 through the guide slot 92. A threaded adjusting screw 102 is provided to vary the spacing of the spacer plates 94, 96 to maintain suitable tension on the ball members 36. The link 52 is rotatably secured to the slide mechanism by a suitable threaded fastening device 104. Although the power transfer mechanism is identical in structure, it is to be noted that the tracing arms are mounted on different portions of the tubes so that a reverse motion is obtained.

In operation, with each of the carriage members 42, 44 slidably mounted on the endless tube member 30 and the slide mechanisms 46, 48 slidably mounted on the endless tube member 32, the spacer plates associated with each device are adjusted to maintain the ball members in power transferring surface engagement with one another. For purposes of description, the tracer arm 38 may be designated as a control arm and the tracer arm 40 may be designated as a follower arm. In order to develop a reverse pattern, the control arm 38 is moved along the original surface and a reverse image of that surface will be traced by the follower arm 40. Rotary movement of the control arm 38 about the central longitudinal axis of the tubular support member 16 will cause similar rotary movement of the follower arm 40. Pivotal motion of the control arm 38 about a pivotal axis defined by the pivotal connection with the carriage 42 is transferred to the link 50 and the slide mechanism 46 to cause axial movement thereof along the tube member 32. The ball members 36 are driven within the tube 32 by the spacer plates associated with the slide mechanism 46 to cause displacement of the spacer plates 94, 96 associated with the slide mechanism 48 and cause a sliding movement on the endless tube 32 which in turn causes rotary movement of the follower arm 40 through the link 52. Linear movement of the control arm 38 causes the carriage 42 to reciprocate on the endless tube members and actuate the ball members 34 in the endless tube 30 through the associated spacer plates. A reverse image or reversed position of the control arm 38 is transmitted to the follower arm 40 by the ball members 34 through the spacer plates 80, 82 to cause sliding movement of the carriage 44.

Although the illustrative embodiment provides a very accurate duplicating mechanism of sturdy simplified construction and provides exceptional results for most applications, it is obvious that additional motions in other planes may be accommodated by the provision of additional endless tube members and similar motion transmitting mechanism. For example, the control arm and the follower arm could be pivoted about a vertical axis and an additional tube member containing power transferring ball members could be provided to transmit vertical rotary motion from the control arm to the follower arm in the aforedescribed manner. It is recognized that various other modifications and changes in the details of construction and the arrangement of the parts may be made in the illustrated preferred embodiment without departing from the spirit of the invention as defined by the appended claims.

I claim:

1. Duplicator apparatus comprising an adjustable support member, a control arm, a control arm carriage slidably supported on said support member, a control arm rotary connection rotatably supporting said control arm on said control arm carriage, a follower arm spaced from said control arm, a follower arm carriage slidably supported on said support member, a follower arm rotary connection rotatably supporting said follower arm on said follower arm carriage, a reciprocatory motion-transferring first tube member extending between said control arm and said follower arm, said first tube member defining an endless path, a plurality of ball members movably contained in said first tube member and being drivingly associated with one another, drive means connected to said control arm carriage and said follower arm carriage and being drivingly associated with said ball members in said first tube member, said drive means for said control arm carriage and said follower arm carriage being relatively positioned so that movement of said control arm carriage actuates said ball members in said tube member to reversely correspondingly position said follower arm carriage, a rotary motion-transferring second tube member extending between said control arm and said follower arm, said second tube member defining an endless path, a plurality of ball members movably contained in said second tube member and being drivingly associated with one another, control arm rotary motion-transferring linkage connected to said control arm and drivingly associated with said ball members in said second tube member, rotary motion power transfer linkage connected to said follower arm and operatively associated with said ball members in said second tube member, and said control arm rotary motion-transferring linkage and said follower arm rotary motion-transferring linkage being arranged and positioned so that rotary movement of said control arm actuates said rotary motion-transferring linkage to drive said ball members within said second tube member to actuate said rotary motion power transfer linkage and reversely correspondingly position said follower arm is response to rotary motion of said control arm.

2. Duplicator apparatus comprising an adjustable support member, a control arm, a control arm carriage slidably supported on said support member, a control arm rotary connection rotatably supporting said control arm on said control arm carriage, a follower arm spaced from said control arm, a follower arm carriage slidably supported on said support member, a follower arm rotary connection supporting said follower arm on said follower arm carriage, a reciprocatory motion-transferring tube member extending between said control arm and said follower arm, said tube member defining an endless path, power transfer means contained in said tube member, drive means connected to said control arm carriage and said follower arm carriage and being drivingly associated with said power transfer means in said tube member, said drive means for said control arm carriage and said follower arm carriage being relatively positioned so that movement of said control arm carriage actuates said power transfer means in said tube member to reversely correspondingly position said follower arm carriage, a rotary motion-transferring second tube member extending between said control arm and said follower arm, said second tube member defining an endless path, power transfer means contained in said second tube member, control arm rotary motion-transferring linkage connected to said control arm and drivingly associated with said power transfer means in said second tube member, rotary motion power transfer linkage connected to said follower arm and operatively associated with said power transfer means in said second tube member, and said control arm rotary motion-transferring linkage and said follower arm rotary motion-transferring linkage being arranged and positioned so that rotary movement of said control arm actuates said rotary motion-transferring linkage to drive said power transfer means within said second tube member to actuate said rotary motion power transfer linkage and reversely correspondingly position said follower arm in response to rotary of said control arm.

3. Motion-transferring mechanism for transferring motion between a control arm and a follower arm, and including, means providing a confined pathway extending between said control arm and said follower arm to define an endless path, a plurality of ball members movably supported along said pathway in driving engagement with one another, drive means connected to said control arm and drivingly associated with said ball members, and driven means connected to said follower arm and operatively associated with said ball members to position said follower arm in response to motion of said control arm transferred through said ball members.

4. The apparatus as defined in claim 3 wherein said means providing a confined pathway comprise endless tube members having generally linear portions interconnected at their extremities by curved portions to define a continuous path, said drive means being drivingly associated with said ball members in one of said linear portions so that movement of said control arm causes movement of said ball members in one direction in said one of said linear portions and a reverse direction in the other of said linear portions, and said driven means being operatively associated with said ball members in said other linear portion so that movement of said control arm actuates said driven means through said drive means and said ball members to reversely correspondingly position said follower arm.

5. Motion-transferring mechanism for transferring motion between a control arm and a follower arm, and including, means providing a confined pathway extending between said control arm and said follower arm and defining a predetermined endless path of movement, power transfer means solely supported by said pathway means for movement along said predetermined endless path, drive means connected to said control arm and drivingly associated with said power transfer means, and driven means connected to said follower arm and operatively associated with said power transfer means to position said follower arm in response to motion of said control arm transferred through said power transfer means.

6. Mechanism defined in claim 5 wherein said means providing a confined pathway comprise endless tube members having two generally linear portions interconnected at their extremities by curved portions to define a continuous path, said drive means being drivingly associated with said ball members in one of said linear portions so that movement of said control arm causes movement of said power transfer means in one direction in said one of said linear portions and a reverse direction in the other of said linear portions, and said driven means being operatively associated with said power transfer means in said other linear portion so that movement of said control arm actuates said driven means through said drive means and said power transfer means to reversely correspondingly position said follower arm.

7. A duplicator comprising, a support, a member rotatably mounted on said support, an endless tube member mounted on said rotatable member for rotational movement therewith, a plurality of interengaged ball members confined within said tube member, first and second slide means drivingly engaged with the ball members in said tube member, means mounting said slide means on said tube member, a pair of tracing arms, one of said arms being adjacent to said first slide means and the other of said arms being adjacent to said second slide means, means mounting said arms on said rotatable member for movement therewith and movement relative thereto and means interconnecting each said slide means and a respective tracing arm whereby movement of one arm causes similar opposite movement of the other arm by means of said slide means and said ball members.

8. A duplicator comprising, a support, a member rotatably mounted on said support, an endless tube member mounted on said rotatable member for rotational movement therewith and defining a predetermined endless path of movement, power transfer means confined within said tube member and solely supported thereby for movement along said predetermined endless path, first and second slide means drivingly engaged with said power transfer means, means mounting said slide means on said tube member, a pair of tracing arms, means mounting said arms on said rotatable member for movement therewith and movement relative thereto, means interconnecting said first slide means and one of said tracing arms, and means interconnecting said second slide means and the other of said tracing arms whereby movement of one arm causes similar opposite movement of said other arm by means of said slide means and said power transfer means.

9. A duplicator comprising, a support, a member rotatably mounted on said support, a pair of endless tube members mounted on said rotatable member for rotational movement therewith, a plurality of interengaged ball members confined within each of said tube members, a first pair of slide means drivingly engaged with the ball members in one of said tube members, a second pair of second slide means drivingly engaged with the ball members in the other of said tube members, means mounting said first and second pairs of slide means on said tube member, a tracing arm rotatably mounted on one slide means of each pair, and means interconnecting the other slide means of each pair and said tracing arm on said one slide means of each pair whereby movement of one arm causes similar opposite movement of the other arm by means of said slide means and said ball members.

10. Means for transmitting reversely similar motion between a control mechanism and a follower mechanism comprising, in combination, carriage means adjacent to said control mechanism, second carriage means adjacent to said follower mechanism, support means slidably supporting each of said carriage means, means mounting said control mechanism on said first carriage means, means mounting said follower mechanism on said second carriage means, a pair of members, each member defining a closed pathway between said carriage means, each of said members including a plurality of interengaged ball members, actuating means connected to each said carriage means and engageable with the ball members of one of said pathway members to move said carriage means equally and oppositely with respect to each other, slide means adjacent to each of said mechanisms, said slide means being operatively engageable with the ball members in the other of said pathway members, means mounting said slide means on said tube member, and means connecting each slide means to a respective mechanism to cause equal and opposite rotative movement of said mechanisms relative to their respective carriage means.

11. Means for transmitting reversely similar motion between a control mechanism and a follower mechanism comprising, in combination, carriage means adjacent to said control mechanism, second carriage means adjacent to said follower mechanism, support means slidably supporting each of said carriage means, means mounting said control mechanism on said first carriage means, means mounting said follower mechanism on said second carriage means, means defining a pair of pathways between said carriage means, each of said pathways including power transfer means, actuating means connected to each said carriage means and engageable with the power transfer means of one of said pathways to move said carriage means equally and oppositely with respect to each other, slide means adjacent to each of said mechanisms, means mounting said slide means on said tube member, said slide means being operatively engageable with the power transfer means of the other of said pathways, and means connecting each slide means to a respective mechanism to cause equal and opposite rotative movement of said mechanisms relative to their respective carriage means.

References Cited in the file of this patent

UNITED STATES PATENTS

| | | |
|---|---|---|
| 841,223 | Bronner | Jan. 15, 1907 |
| 2,793,569 | Tanner et al. | May 28, 1957 |

UNITED STATES PATENT OFFICE
CERTIFICATE OF CORRECTION

Patent No. 3,130,498                                April 28, 1964

Julius Hezler, Jr.

It is hereby certified that error appears in the above numbered patent requiring correction and that the said Letters Patent should read as corrected below.

Column 4, line 2, after "connection" insert -- rotatably --; line 32, after "rotary" insert -- motion --; line 47, after "having" insert -- two --.

Signed and sealed this 8th day of September 1964.

(SEAL)
Attest:

ERNEST W. SWIDER                              EDWARD J. BRENNER
Attesting Officer                                   Commissioner of Patents